(12) United States Patent
Delin et al.

(10) Patent No.: US 10,746,585 B2
(45) Date of Patent: Aug. 18, 2020

(54) RADAR LEVEL GAUGING WITH WAIT STATE

(71) Applicant: Rosemount Tank Radar AB, Mölnlycke (SE)

(72) Inventors: Håkan Delin, Linköping (SE); Urban Blomberg, Linköping (SE); Lars Ove Larsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 294 days.

(21) Appl. No.: 15/720,074

(22) Filed: Sep. 29, 2017

(65) Prior Publication Data

US 2019/0101431 A1  Apr. 4, 2019

(51) Int. Cl.
*G01F 23/284* (2006.01)
*G01S 13/88* (2006.01)

(52) U.S. Cl.
CPC .......... *G01F 23/284* (2013.01); *G01S 13/88* (2013.01)

(58) Field of Classification Search
CPC ................................ G01F 23/284; G01S 7/35
See application file for complete search history.

(56) References Cited

U.S. PATENT DOCUMENTS

| | | | |
|---|---|---|---|
| 7,334,451 B1 | 2/2008 | Fauveau | |
| 7,525,476 B1 * | 4/2009 | Delin | G01F 23/284 |
| | | | 324/600 |
| 8,159,386 B2 | 4/2012 | Malinovskiy et al. | |
| 2005/0035769 A1 | 2/2005 | Otto et al. | |
| 2006/0044145 A1 | 3/2006 | Akerstrom et al. | |
| 2006/0137446 A1 | 6/2006 | Wennerberg et al. | |
| 2007/0046528 A1 | 3/2007 | Larsson et al. | |
| 2010/0182190 A1 | 7/2010 | Spanke et al. | |
| 2013/0069817 A1 | 3/2013 | Wenger | |
| 2016/0153822 A1 * | 6/2016 | Gorenflo | G01F 23/0061 |
| | | | 73/290 V |

FOREIGN PATENT DOCUMENTS

WO  WO 2004/048904  6/2004

OTHER PUBLICATIONS

Notification of Transmittal of the International Search Report and the Written Opinion of the International Searching Authority from PCT/EP2018/076192, dated Dec. 13, 2018.

* cited by examiner

*Primary Examiner* — Marc Anthony Armand
(74) *Attorney, Agent, or Firm* — Westman, Champlin & Koehler, P.A.

(57) ABSTRACT

A radar level gauge for determining a process variable of product in a tank, having processing circuitry configured to process a tank signal and, when no surface echo can be identified, enter a wait state. The wait state includes a) storing the tank signal in memory, b) obtaining a wait state tank signal, c) comparing the wait state tank signal with the stored tank signal to determine a tank signal difference measure, d) repeating steps b) and c) until the tank signal difference measure is greater than a predefined threshold, e) processing the wait state tank signal to identify a surface echo, and f) when no surface echo can be identified in the wait state tank signal, setting an alarm.
By storing the tank signal when the wait state is entered, it is therefore possible to defer an alarm until the tank signal deviates from this stored tank signal.

16 Claims, 3 Drawing Sheets

RADAR LEVEL GAUGING WITH WAIT STATE

FIELD OF THE INVENTION

The present invention relates to a method and a radar level gauge for determining a process variable such as the filling level of a product in a tank.

BACKGROUND OF THE INVENTION

A radar level gauge (RLG) is suitably used for making measurements of a process variable, e.g. a filling level, of a product such as process fluids, granular compounds and other materials contained in a tank, e.g. a silo.

An example of such a radar level gauge can include transceiver circuitry for transmitting and receiving microwaves, a signal propagating device arranged to direct microwaves towards the surface and to return microwaves reflected by the surface to the transceiver, and processing circuitry adapted to determine the filling level based on a relation between microwaves transmitted and received by the transceiver. The signal propagation device may be for example a directional antenna or a transmission line probe.

There are different principles for performing radar level gauges, including frequency modulated continuous wave (FMCW) and time domain reflectometry (TDR). An FMCW based RLG will emit a radar sweep with gradually varying frequency, and mix the received signal with the original signal (homodyne mixing) to form a frequency domain tank signal. A TDR based RLG will emit a pulse train of very short pulses (order of ns), and sample the received signal with the original signal in a sample and hold circuit, thereby forming a time domain tank signal.

In both cases, the tank signal will include a set of peaks indicating echoes from the tank, and one of these peaks corresponds to the echo from the surface.

The processing is configured to identify, and typically also track, the relevant echoes, in order to distinguish the surface echo from other echoes, such as reflections from structures in the tank, double bounces, etc. The surface echo can then be used to determine the distance to the surface, and consequently the filling level.

However, in some situations, it may not be possible to distinguish the surface echo in the tank signal. In the case of liquids, an undetectable echo may be caused e.g. by turbulence on the surface, or a patch of foam located underneath the antenna or around the probe, such that the echo is not strong enough. In the case of solids, e.g. grain or pellets, an undetectable echo may be caused by a surface which deviates from the horizontal plane to such an extent that the echo cannot be received by the antenna. In this case (solids) the problem may also remain for longer periods, as the slope of the surface will not change until something disturbs the product in the tank. In some cases, this will not happen until the tank is filled or emptied. In extreme cases, the surface may remain undetectable for hours or days.

In principle, an undetectable surface represents a fault condition which should be communicated e.g. by an alarm. However, for many applications, it is quite normal that the surface is undetectable at least for shorter periods of time, and it would be inconvenient to raise an alarm every time. A conventional approach to handling a temporarily undetectable surface is to let the radar level gauge enter a "wait state" for a predetermined time period. If the surface echo reappears during this time, no alarm is necessary, and the level gauging may be resumed. However, if no surface echo has reappeared at the end of the predetermined time, an alarm will be set.

A drawback with this approach is that the level gauge is "blind" during the wait state, and cannot determine if the surface is moving. Therefore, in order to maintain a high level of security, the time period cannot be set too long, and is typically set to a few minutes.

GENERAL DISCLOSURE OF THE INVENTION

It is an object of the present invention to mitigate the above problem, and allow longer periods of undetectable surface with maintained level of security.

According to a first aspect of the present invention, this and other objects are achieved by a radar level gauge for determining a process variable of product in a tank, comprising transceiver circuitry configured to obtain a tank signal by combining an electromagnetic transmit signal and an electromagnetic return signal caused by a reflection of the transmit signal in the tank, the tank signal including a plurality of peaks representing echoes from the interior of the tank, and processing circuitry configured to process the tank signal to identify a surface echo, when a surface echo can be identified, determine the process variable based on the surface echo, and when no surface echo can be identified in the tank signal, entering a wait state. The wait state includes:

a) storing the tank signal in memory,
b) obtaining a wait state tank signal,
c) comparing the wait state tank signal with the stored tank signal to determine a tank signal difference measure,
d) repeating steps b) and c) until the tank signal difference measure is greater than a predefined threshold,
e) processing the wait state tank signal to identify a surface echo, and
f) when no surface echo can be identified in the wait state tank signal, setting an alarm.

According to a second aspect of the present invention, this and other objects are achieved by a method for determining a process variable of product in a tank, comprising obtaining a tank signal by combining an electromagnetic transmit signal and an electromagnetic return signal caused by a reflection of the transmit signal in the tank, the tank signal including a plurality of peaks representing echoes from the interior of the tank, processing the tank signal to identify a surface echo, when a surface echo can be identified, determine the process variable based on the surface echo, and when no surface echo can be identified in the tank signal, entering a wait state. The wait state includes:

a) storing the tank signal in memory,
b) obtaining a wait state tank signal,
c) comparing the wait state tank signal with the stored tank signal to determine a tank signal difference measure,
d) repeating steps b) and c) until the tank signal difference measure is greater than a predefined threshold,
e) processing the wait state tank signal to identify a surface echo, and
f) when no surface echo can be identified in the wait state tank signal, setting an alarm.

The present invention is based on the realization that even when no surface echo can be distinguished, it is typically possible to determine that the surface has not moved, simply by establishing that the tank signal has not changed. By storing the tank signal when the wait state is entered, it is therefore possible to defer an alarm until the tank signal deviates from this stored tank signal.

In an actual implementation, embodiments of the present invention may significantly prolong the time before an alarm is actually required. For example, in case of a solid product (e.g. grain) a non-horizontal surface may inhibit reliable surface echo detection for hours, days or even weeks. If the tank signal remains unchanged during this period, then it can safely be assumed that the surface is not moving, and an alarm can therefore be avoided.

In some embodiment, the comparison with the stored tank signal is followed by a more conventional time-out period. In other words, when it has been established that the tank signal has changed (and therefore it can no longer be assumed that the surface is not moving) the radar level gauge may repeatedly obtain new tank signals and try to find a surface echo for a predetermined period of time. Similar to a conventional wait-state, as discussed above, this additional time-out is based on the fact that the surface, even after it starts moving, cannot reach a critical level immediately. If the surface echo can be found relatively quickly, no alarm is necessary.

Again with reference to a solid product with a non-horizontal surface, when an emptying or filling operation is initiated the tank signal will change immediately, but it may take a few second before the surface is sufficiently level to provide a detectable surface echo.

The tank signal may be a frequency domain signal or a time domain signal, and the radar level gauge may be equipped with a directional antenna (non-contact radar) or a transmission line probe (guided wave radar).

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1A:
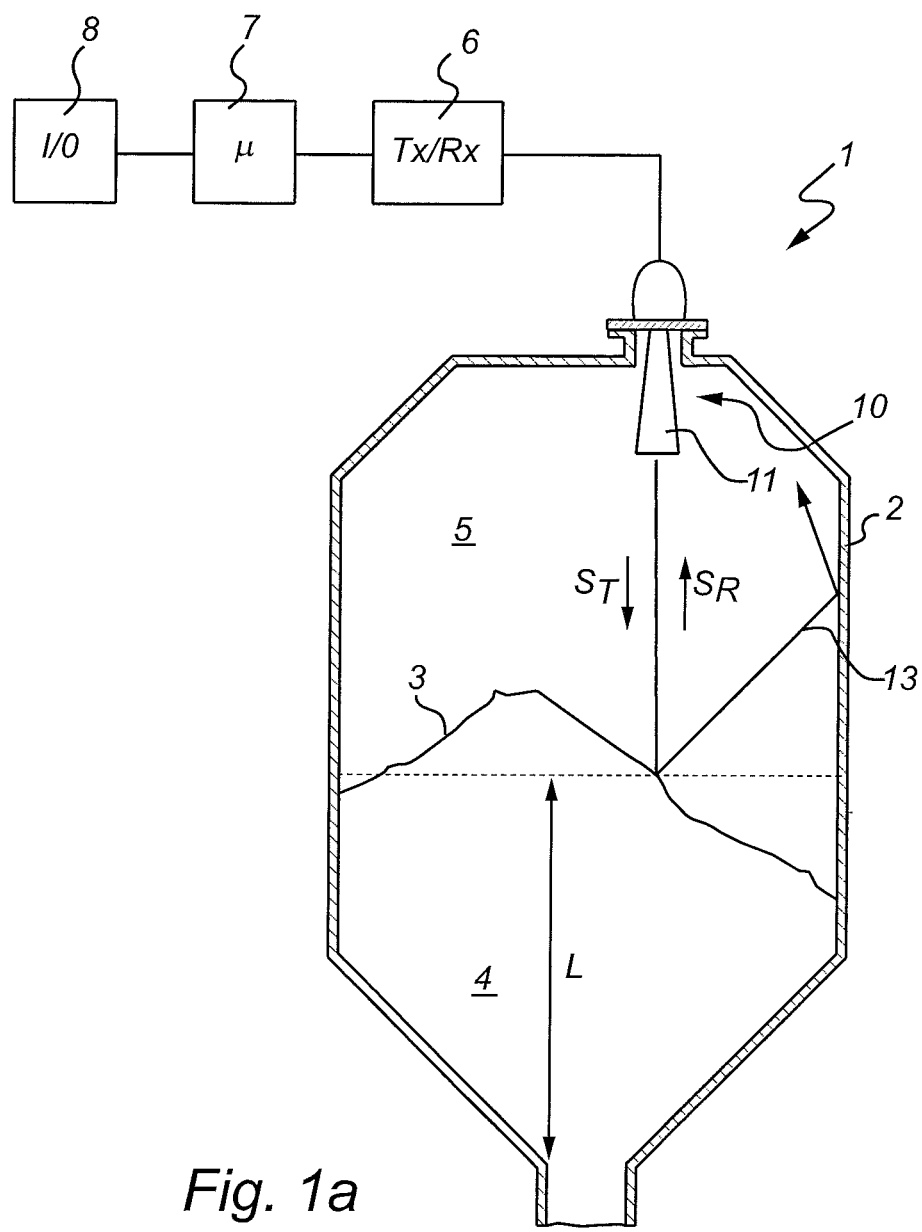
FIGS. 1a and 1b schematically illustrate two types of radar level gauges suitable for implementing the present invention.
Figure 1B:
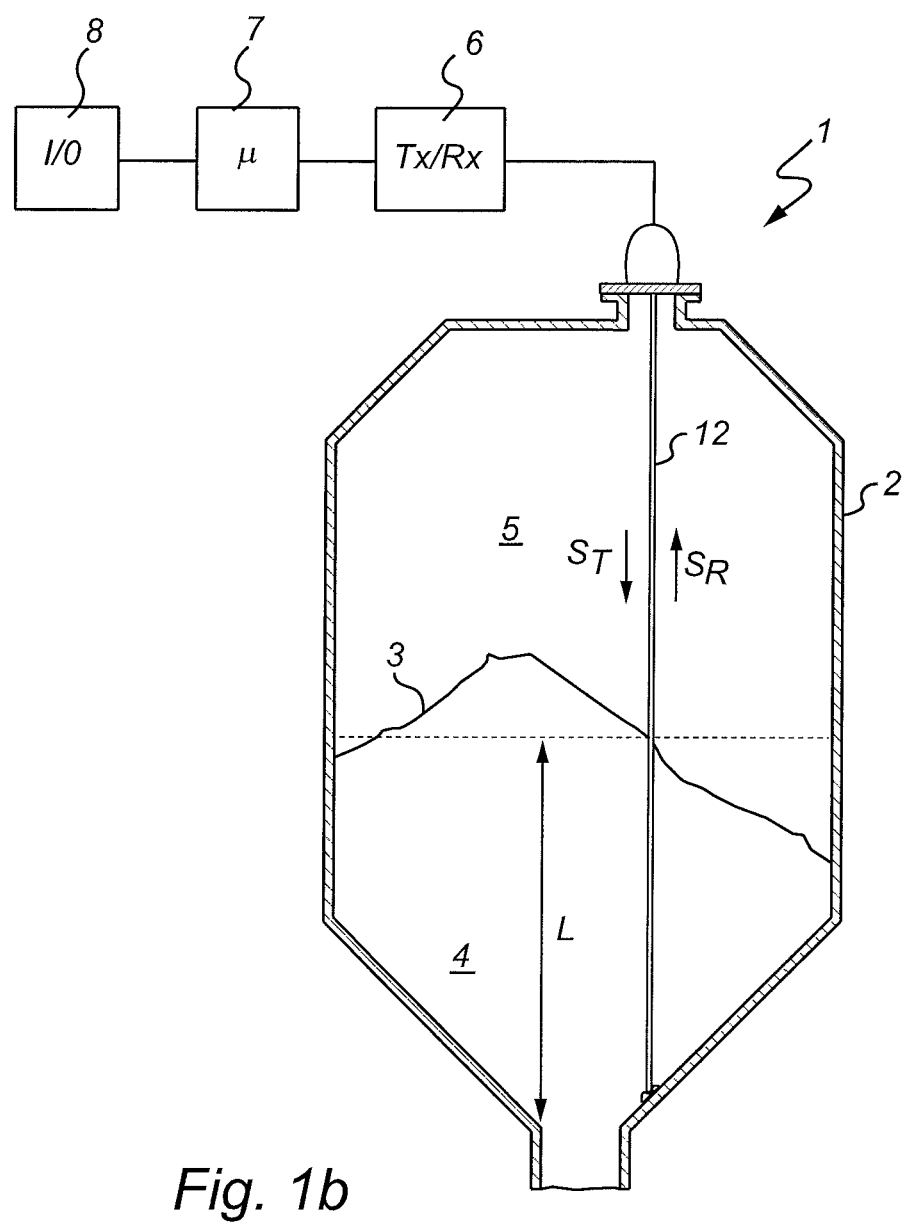

FIG. 1a-1b show two examples of a radar level gauge (RLG) 1 where the present invention may be applied. The RLG 1 is mounted on a tank 2, and arranged to determine a process variable related to a distance to an interface 3 between two materials 4,5 contained in the tank 2. Typically, the first material is a product 4 stored in the tank, while the second material is air or other atmosphere 5 in the tank. In the illustrated case, the product 4 is a granular compound, and the interface is simply the surface 3 of the product 4.

The radar level gauge 1 includes transceiver circuitry 6 connected to processing circuitry 7.

The transceiver circuitry 6 may be one functional unit capable of transmitting and receiving electromagnetic signals, or may be a system comprising separate transmitter and receiver units. The elements of the transceiver circuitry 6 are typically implemented in hardware, and form part of an integrated unit normally referred to as a microwave unit. For simplicity, the transceiver circuitry is referred to as the "transceiver" in the following description.

The processing circuitry 7 may include a combination of analogue processing realized in hardware, and digital processing realized embodied by software modules stored in a memory and executed by an embedded processor. The invention is not restricted to the particular realization, and any implementation found suitable to realize the herein described functionality may be contemplated.

The transceiver 6 is electrically connected to a suitable signal propagation device 10, arranged to allow electromagnetic signals to propagate towards the surface 3 of the product 4, and to return a reflection of the electromagnetic signals from the tank. The transceiver 6 is configured to generate and transmit electromagnetic transmit signals $S_T$ which are propagated towards the surface 3 of the product 4 by the signal propagation device. Electromagnetic return signals $S_R$ are caused by a reflection in the surface 3, and are returned by the signal propagation device 10 and fed back to the transceiver 6.

The processing circuitry 7 is configured to determine the distance between a reference position at the top of the tank and the surface 3 by analyzing the transmit signal $S_T$ and the return signal $S_R$. The processing typically includes generation of a tank signal or "echo curve", including a plurality of peaks representing echoes from the interior of said tank. One of the peaks represent an echo from the surface 3.

The RLG 2 further comprises an interface 8 for communication of a measurement value externally of the RLG and optionally for power supply of the RLG. For example, the interface 8 may be a two-wire control loop, such as a 4-20 mA loop. The interface 8 may also include a serial data bus, allowing communication using a digital communication protocol. Examples of available digital protocols include HART, Modbus, Profibus and Foundation Fieldbus. The interface 8 may also be a wireless interface, employing e.g. wireless HART.

In FIG. 1a, the signal propagation device 10 is a free-propagating directional antenna 11, and the RLG 1 is referred to as a non-contact radar (NCR) level gauge. Sometimes the antenna is coupled to a wave guiding structure in the form of a pipe (referred to as a "still pipe") in order to reduce interference and to ensure a calm surface.

In FIG. 1b, the signal propagation device 10 is a probe 12, i.e. a transmission line extending into the content of the tank. In this case the transmit signal and echo signal will propagate along the probe until they are reflected by the impedance discontinuity caused by the surface 3. An RLG with a probe is sometimes referred to as guided wave radar (GWR) level gauge. Several types of probes, for example single-line (Goubau-type), coaxial, and twin-line probes may be used. The probes may be essentially rigid or flexible and they may be made from metal, such as stainless steel, plastic, such as PTFE, or a combination thereof.

The transmit signal in a NCR level gauge, such as the one illustrated in FIG. 1a, is typically in the GHz range, e.g. around 6 GHz or 26 GHz, with a band-width of one or several GHz. The transmit signal in a GWR, such as the one illustrated in FIG. 1b, is typically a DC pulse train, although high frequency signals may also be used.

According to one measuring principle, the transmit signal is a continuous signal with varying frequency (frequency modulated continuous wave, FMCW). An FMCW based RLG will emit a radar sweep with gradually varying frequency, and mix the received signal with the original signal (homodyne mixing) to form a frequency domain tank signal. This principle is mostly used with NCR level gauges, but applications also to GWR have been proposed.

According to another measurement principle, the transmit signal is a train of distinct pulses with a duration in the order of ns and a repletion frequency in the order of MHz. The return signal is sampled with the original pulse train in a sample and hold circuit in a process known as time domain reflectometry (TDR), thereby forming a time domain tank signal. Time domain reflectometry is commonly used with GWR level gauges, in which case the pulses may be DC pulses. The principle may also be used for NCR level gauges, in which case the pulses need to be frequency modulated to allow emission with a directional antenna.

The transmit signal may also be some combination of FMCW and a pulsed signal. For example, a principle known as multiple frequency pulsed wave (MFPW) has been proposed.

In case of a frequency domain tank signal, the amplitude of the signal is expressed as a function of frequency, where the frequency is related to the distance from the reference position. In case of a time domain tank signal, the amplitude of the signal is expressed as a function of time, where the time is related to the distance from the reference position. Based on the determined distance to the surface 3, generally referred to as ullage, and known dimensions of the tank 5, the process circuitry 6 can deduce a process variable such as the filling level L of the tank.

In the example illustrated in FIGS. 1a-1b, the product 4 is a solid, such as a granular compound, and the surface 3 is non-horizontal. As a consequence, the echo from the surface may be difficult to identify in the tank signal. In FIG. 1a, the signal energy 13 reflected by the surface 3 is not directed towards the antenna 11, and the peak in the tank signal corresponding to this reflection therefore becomes weak. In FIG. 1b, the surface echo will not occur at the same time on all sides of the probe 12, thereby causing the peak in the tank signal to be more extended in time and thus may be more difficult to detect. Also for a fluid product there may be reasons for a temporarily undetectable surface echo, such as foam or turbulence on the surface, both for antennas and probe applications.

For safety reasons, an alarm should be issued when the surface echo is undetectable. However, in many cases, the surface echo will reappear before the surface has moved significantly, and most radar level gauges therefore enter a "wait state" during a predefined time period. Only if the surface echo does not reappear during this time will an alarm be issued. During the wait state, typically the gauge continues to output the most recently determined measurement value.

Figure 2:
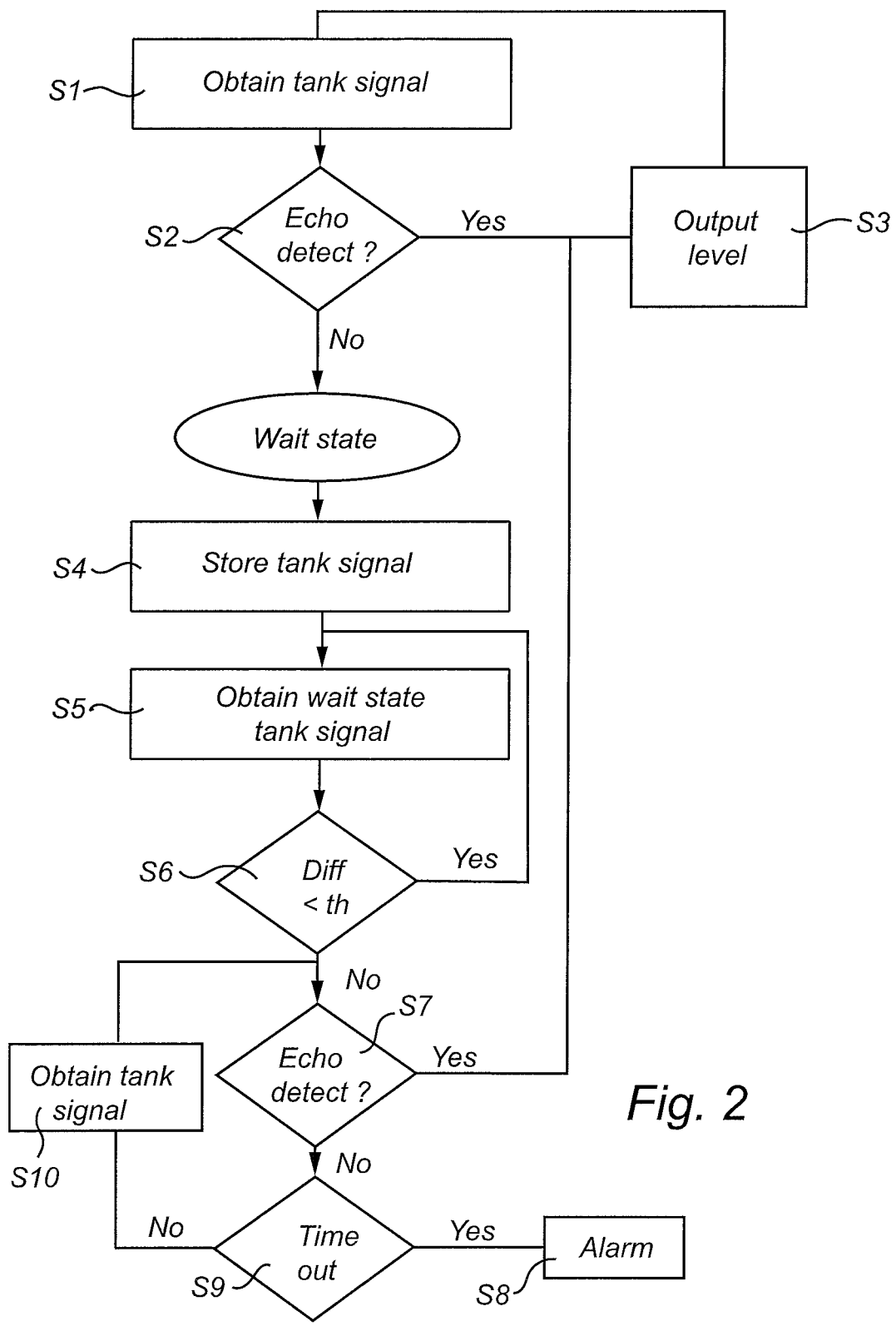
FIG. 2 is a flow diagram illustrating an embodiment of a method according to the present invention.

A wait state according to an embodiment of the present invention is illustrated in the flow chart in FIG. 2. The first steps of the flow chart relate to the normal measurement cycle, and include performing a measurement to obtain a tank signal in step S1, detecting a surface echo in step S2, and outputting a measurement result, e.g. the filling level, in step S3.

As discussed above, the details of the measurement in step S1, and how the tank signal is obtained can be different depending on the type of signal propagation device (e.g. NCR or GWR) and the type of detection principle (e.g. FMWC or TDR). Further, the resulting tank signal may have different properties, and may for example be in a frequency domain or a time domain signal. In a successful detection, the tank signal will include a peak associated with a surface reflection, and this peak will be used to identify a distance to the surface.

However, if, in step S2, it is not possible to identify any surface echo in the tank signal, processing will continue to a wait-state. During the wait state, step S3 may continue to be active, i.e. the gauge may continue to output the most recently determined measurement result. The wait state begins in step S4 by storing the tank signal in memory. Then, in step S5, a further measurement is performed in the same way as in step S1, in order to obtain another tank signal referred to as a "wait-state tank signal". In step S6, the wait-state tank signal is compared with the tank signal which was stored in step S4 to provide a difference measure.

The difference measure can be based on a variation in amplitude (or energy) of the tank signal. Such a difference measure can be obtained by a simple subtraction, and comparison sample by sample to see if one or several samples differ more than a threshold. If several samples are used in the comparison, an absolute value of the subtraction is preferably used. Optionally, a difference signal (i.e. the result of a subtraction of the stored tank signal from the wait state tank signal) may be integrated over the entire distance range or over a selected distance range. For example, it may be sufficient to consider changes occurring in a neighborhood of the most recently detected surface echo. Spectrum analysis and energy spectrum analysis may also be used, either on the difference signal or directly on the stored tank signal and wait state tank signal, respectively.

The difference measure may also be based on the shape of the tank signal, and more specifically on the location of detectable peaks (local maxima). For example, if a stored tank signal (where no surface echo can be detected) has a set of identifiable peaks, then it may be sufficient to compare the positions of these peaks in the wait state tank signal.

If the comparison in step S6 indicates that the difference measure is less than a predefined threshold, this suggests that the return signal received from the tank is substantially unchanged, and it may therefore be assumed that the surface 3 has not moved. Under these circumstances, the process returns to step S5 to perform yet another measurement to obtain another wait-state tank signal. The repetition of steps S5 and S6 can continue for as long as the wait-state tank signal does not deviate from the stored tank signal, which may be for considerable time, e.g. a matter of days, weeks or more.

If, on the other hand, the comparison in step S6 indicates that the difference measure exceeds the threshold, this suggests that something has changed in the tank, and it cannot be safely assumed that the surface 3 is unchanged. Under these circumstances, the wait-state tank signal is analyzed in step S7 in order to detect a surface echo. If a surface echo is detected, the process returns to step S3 of the normal measurement cycle, and outputs a measurement result.

If no surface echo can be detected in step S7, it can be established that the surface has likely moved, but that the level gauge is unable to provide a new measurement. In this situation, the process may continue to step S8 to issue an alarm. The alarm may in principle be issued immediately after step S7. However, for reasons similar to those discussed above with respect to a conventional wait state, it may be useful to first wait for a predetermined time to see if the surface echo reappears. In that case, the process may include a step S9 to check if the time out period has expired. If the time out period has not expired, the process will continue to step S10 to obtain yet another tank signal, and repeat steps S7 and S9 until the time out period has expired. If no surface echo can be detected before the time out period expires in step S9, the process will continue to step S8 and issue the alarm. The appropriate duration of the time-out period will depend on the application, and may be in the order of minutes.

The time out period in step S9 is similar to the time out period in conventional wait state processing, discussed above. However, contrary to conventional wait state processing, the time out period is not triggered until a change of the surface has been detected in step S6.

The person skilled in the art realizes that the present invention by no means is limited to the preferred embodiments described above. On the contrary, many modifications and variations are possible within the scope of the appended claims. For example, details in the implantation of the method, as reflected by the flow chart in FIG. 2, may be different. In particular, the step of obtaining a tank signal, which occurs on several places in FIG. 2, may in practice be performed by one single sub-routine, thereby altering the process flow somewhat.

What is claimed is:

1. A radar level gauge for determining a process variable of product in a tank, said gauge comprising:
    transceiver circuitry configured to obtain a tank signal by combining an electromagnetic transmit signal and an electromagnetic return signal caused by a reflection of said transmit signal in the tank, said tank signal including a plurality of peaks representing echoes from the interior of said tank; and
    processing circuitry configured to:
        process said tank signal to identify a surface echo,
        when a surface echo can be identified, determine said process variable based on said surface echo, and
        when no surface echo can be identified in the tank signal, entering a wait state, said wait state including:
            a) storing the tank signal in memory,
            b) obtaining a wait state tank signal,
            c) comparing said wait state tank signal with the stored tank signal to determine a tank signal difference measure,
            d) repeating steps b) and c) until the tank signal difference measure is greater than a predefined threshold,
            e) processing said wait state tank signal to identify a surface echo, and
            f) when no surface echo can be identified in said wait state tank signal, setting an alarm.

2. The radar level gauge according to claim 1, wherein, when no surface echo can be identified in said wait state tank signal, the processing circuitry is further configured to repeatedly obtain a further wait state tank signal and process said further wait state tank signal to identify a surface echo until a pre-defined time period has expired.

3. The radar level gauge according to claim 1, further including a directional antenna connected to the transceiver circuitry, said directional antenna intended to be mounted in a top of said tank to emit the transmit signal towards said surface and to receive the return signal.

4. The radar level gauge according to claim 1, further including a transmission line probe connected to the transceiver circuitry, said transmission line probe intended to be suspended in the tank and extend beyond said surface to guide the transmit signal towards said surface and to guide the return signal back to the transceiver circuitry.

5. The radar level gauge according to claim 1, wherein said tank signal is a frequency domain signal.

6. The radar level gauge according to claim 5, wherein said transmit signal is a frequency modulated continuous wave (FMCW).

7. The radar level gauge according to claim 1, wherein said transmit signal is a train of distinct pulses, and said tank signal is a time domain signal.

8. The radar level gauge according to claim 7, wherein said pulses are frequency modulated.

9. A method for determining a process variable of product in a tank, comprising the steps of:
    emitting, by a transceiver, an electromagnetic transmit signal into the tank;
    receiving, by the transceiver, an electromagnetic return signal caused by a reflection of said transmit signal in the tank;
    obtaining, by processing circuitry, a tank signal by combining the electromagnetic transmit signal and the electromagnetic return signal, said tank signal including a plurality of peaks representing echoes from the interior of said tank;
    processing said tank signal in said processing circuitry to identify a surface echo;
    when a surface echo can be identified, determine said process variable based on said surface echo; and
    when no surface echo can be identified in the tank signal, entering a wait state, said wait state including:
        a) storing the tank signal in memory,
        b) obtaining, using the transceiver and processing circuitry, a wait state tank signal,
        c) comparing, by said processing circuitry, said wait state tank signal with the stored tank signal to determine a tank signal difference measure,
        d) repeating steps b) and c) until the tank signal difference measure is greater than a predefined threshold,
        e) processing said wait state tank signal in the processing circuitry to identify a surface echo, and
        f) when no surface echo can be identified in said wait state tank signal, setting an alarm.

10. The method according to claim 9, further comprising, when no surface echo can be identified in said wait state tank signal, repeatedly obtaining a further wait state tank signal and processing said further wait state tank signal to identify a surface echo until a pre-defined time period has expired.

11. The method according to claim 9, wherein said transmit signal is emitted from the transceiver circuitry into the tank by a directional antenna mounted in a top of said tank, and wherein said return signal is received by said directional antenna.

12. The method according to claim 9, wherein said transmit signal is guided from the transceiver circuitry into the tank by a transmission line probe suspended in the tank and extending beyond said surface, and wherein said return signal is guided by said transmission line probe back to the transceiver circuitry.

13. The method according to claim 9, wherein said tank signal is a frequency domain signal.

14. The method according to claim 13, wherein said transmit signal is a frequency modulated continuous wave (FMCW).

15. The method according to claim 9, wherein said transmit signal is a train of distinct pulses, and said tank signal is a time domain signal.

16. The method according to claim 15, wherein said pulses are frequency modulated.

* * * * *